United States Patent
Kumar (10) Patent No.: US 7,058,561 B1
(45) Date of Patent: Jun. 6, 2006

(54) SYSTEM, METHOD AND PROGRAM PRODUCT FOR OPTIMISING COMPUTER SOFTWARE BY PROCEDURE CLONING

(75) Inventor: Sinha Navin Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 09/704,649

(22) Filed: Nov. 2, 2000

(51) Int. Cl.
G06F 9/45 (2006.01)

(52) U.S. Cl. .................. 703/22; 717/144; 717/157; 717/160; 714/38

(58) Field of Classification Search .............. 717/9, 717/8, 151, 159, 144, 157, 160; 703/22; 714/38
See application file for complete search history.

(56) References Cited

U.S. PATENT DOCUMENTS

| | | | | |
|---|---|---|---|---|
| 5,787,245 A | * | 7/1998 | You et al. ............... | 714/38 |
| 5,797,013 A | * | 8/1998 | Mahadevan et al. ...... | 717/160 |
| 5,812,855 A | * | 9/1998 | Hiranandani et al. ..... | 717/157 |
| 5,815,653 A | * | 9/1998 | You et al. ............... | 714/38 |
| 5,857,105 A | * | 1/1999 | Ayers et al. ............. | 717/144 |
| 5,950,009 A | * | 9/1999 | Bortnikov et al. ........ | 717/158 |
| 6,026,241 A | * | 2/2000 | Chow et al. ............. | 717/152 |
| 6,381,739 B1 | * | 4/2002 | Breternitz et al. ....... | 714/37 |
| 6,481,008 B1 | * | 11/2002 | Chaiken et al. .......... | 717/158 |

* cited by examiner

*Primary Examiner*—Anthony Knight
*Assistant Examiner*—Sunray Chang
(74) *Attorney, Agent, or Firm*—Schmeiser, Olsen & Watts; William H. Steinberg (57) ABSTRACT

A method, system and program product for optimizing software in which procedure clones are created based on the control flow information for the procedure body. In an example, a control flow graph for a called procedure is constructed and, for a branching node which can direct program flow to two or more code branches of the procedure, respective clones or new procedures are formed one for each code branch. A list containing pointers to the clones and the respective branch conditions for those clones is formed. Then, for each call site, the list is scanned to see if a particular call could be replaced by a call to a clone. Meanwhile, each clone is optimized and this may lead to removal of dead code or the replacement of a particular call statement by a constant.

18 Claims, 7 Drawing Sheets

SYSTEM, METHOD AND PROGRAM PRODUCT FOR OPTIMISING COMPUTER SOFTWARE BY PROCEDURE CLONING

BACKGROUND OF THE INVENTION

1. Field of the Invention

The invention relates to a system, method an program product for optimising computer software by the technique of procedure cloning. The term "program product" here means a body of computer code stored by a machine readable storage medium such as a CD Rom or one or more floppy discs, or made available for downloading from a remote computer site. The computer code may be integrated within a compiler and be operable for optimising object or intermediate code formed by the compiler.

2. Related Art

A computer program may comprise a call statement for calling a procedure, function or sub-routine (each referred to hereinafter as a "procedure") included in the program itself or provided in a separate library of procedures or as a respective separate object file. Often a particular procedure is called several or even many times by statements at respective different "call-sites" within the program.

In most cases, the procedures will be provided with parameters or arguments supplied by the call site.

In order to optimise a computer program under development, the technique known as procedure cloning may be useful. This known technique involves the creation of copies of procedures with specialised values of parameters passed to them at a specific site. For example, given a procedure void proc(int a, int b);

and a call-site that calls this procedure as:

proc(10,b);

the procedure might be cloned as:

void proc__1(int b)

where the procedure body is re-computed by setting a=10 at the beginning of the procedure, and propagating this value in the procedure body. The original call then will be replaced as a call to this cloned procedure:

proc__1(b)

The advantages of procedure cloning is that the cloned specialised procedure may be more efficient and sometimes it may be integrated into the computer code at the relevant call site. In some cases, the specialised procedure may turn out to be a NULL item which is never executed at that call site or it may return a parameter which is a constant. Then, of course, the call statement could be removed.

Another technique useful for software optimisation in conjunction with procedure cloning relates to call graphs. In computer science a graph consists of a collection of vertices or "nodes" joined by lines called 'edges'. A graph may be used to represent many different situations or problems. A control flow graph is a way of representing the dependencies between items of control flow code in a computer program and code branches to which program flow is directed by the control flow code. Such a graph is formed with a series of branching nodes representing items of control flow code and further nodes for the code branches. Arrows are drawn identifying "edges" or the interfaces between the nodes. The call parameters, i.e. the variables passed to the code branches by the control flow code are often also shown adjacent the arrows. U.S. Pat. No. 5,812,855 to Hiranandani et al discloses a system and method for use in the inter-procedural optimisation of computer software where such call graphs or control flow graphs are used. As disclosed by Hiranandani et al, the use of control flow graphs in conjunction with procedure cloning can assist optimising processes. In particular, the construction of a control flow graph can help to identify a procedure which it would be useful to clone. Thus, in Hiranandani et al, cloning is done by reference to whether a particular node receives calls from an "unknown" call site, i.e. whether the node may be called by a previously compiled item of object code and which is hence unamenable to optimisation.

Even so, it remains the case that procedure calls present a difficult barrier for accurate analysis and optimisation of code. Without care, much information may be lost at a call-site regarding the possible behaviour and values of variables and the object of the invention is to provide a means for ensuring that such loss is minimized whilst enhancing the possibility of creating and using specialised versions of procedure bodies.

SUMMARY OF THE INVENTION

According to the invention, there is provided a method and/or a system for optimising computer software that includes one or more call statements and a procedure which is callable by the or each call statement and which has two or more code branches and control flow code for directing program flow to the code branches. The method comprises the steps of analysing the procedure to identify said control flow code and said code branches, identifying for each said code branch a new procedure containing the respective code branch, recording a list of data entries corresponding to the respective new procedures, each entry comprising a data item identifying the respective new procedure and a data item representative of the branch conditions under which said control flow code directs program flow to the associated code branch, and for the or each call statement, scanning the entries in said list to determine one for which there is correspondence between said branch conditions and call parameters directed to said control flow code by the call statement and modifying the call statement to replace the call to the original procedure by a call to the corresponding new procedure. Similarly the system of the invention comprises respective means for carrying out the steps of the method.

A preferred implementation of the invention is in the form of a program product comprising object code stored on a media such as a CD Rom or a set of floppy discs, or made available for downloading from another computer such as a computer operating as a Website.

Preferably, step (a) of the method comprises constructing a control flow graph for the procedure, the control flow graph comprising a branching node representative of said control flow code and further nodes representing respective ones of said code branches.

Thus, in the description to follow, there is disclosed a technique for cloning procedures based on the control-flow information of the procedure body. The procedure body is analysed and specialised versions of the procedure are created. Then, for each such version, there is stored the conditions on the parameters and global variables that would lead to this specialised version being executed. The <condition, specialised version> pairs are stored as a list. At specific call-sites, the list is scanned in order to determine the strongest of these conditions which can be proved to hold at the call-site. If there is such a condition, the call to the original procedure is replaced by a call to the associated specialised version. A given specialised version can have a NULL body, in which case, the call can be avoided altogether.

This technique breaks down a generalised procedure body into specialised versions, each to be executed under specific circumstances. In addition to the traditional procedure cloning technique, which clones a procedure based on specific parameter values, here cloning can be done on more general conditions (even symbolic).

Specialised versions of procedure bodies may facilitate further analysis and optimisation, as the effect of a call to a specialised procedure clone may be more straightforward to compute than the call to the original version.

Also, creation of smaller procedure bodies can facilitate procedure inlining which might trigger off further optimisation, like constant propagation, elimination of redundant conditional tests, and such.

A possible disadvantage of the technique is the need to beware of code-explosion, since so many copies of the same procedure are created, but this can be dealt with in the same way as code-explosion by inlining is controlled—by defining cost conditions which should be satisfied before a specialisation can be performed.

DESCRIPTION OF THE DRAWINGS

Embodiments of the present invention will be described by reference to the accompanying drawings. In these drawings:—

DETAILED DESCRIPTION

Figure 1:
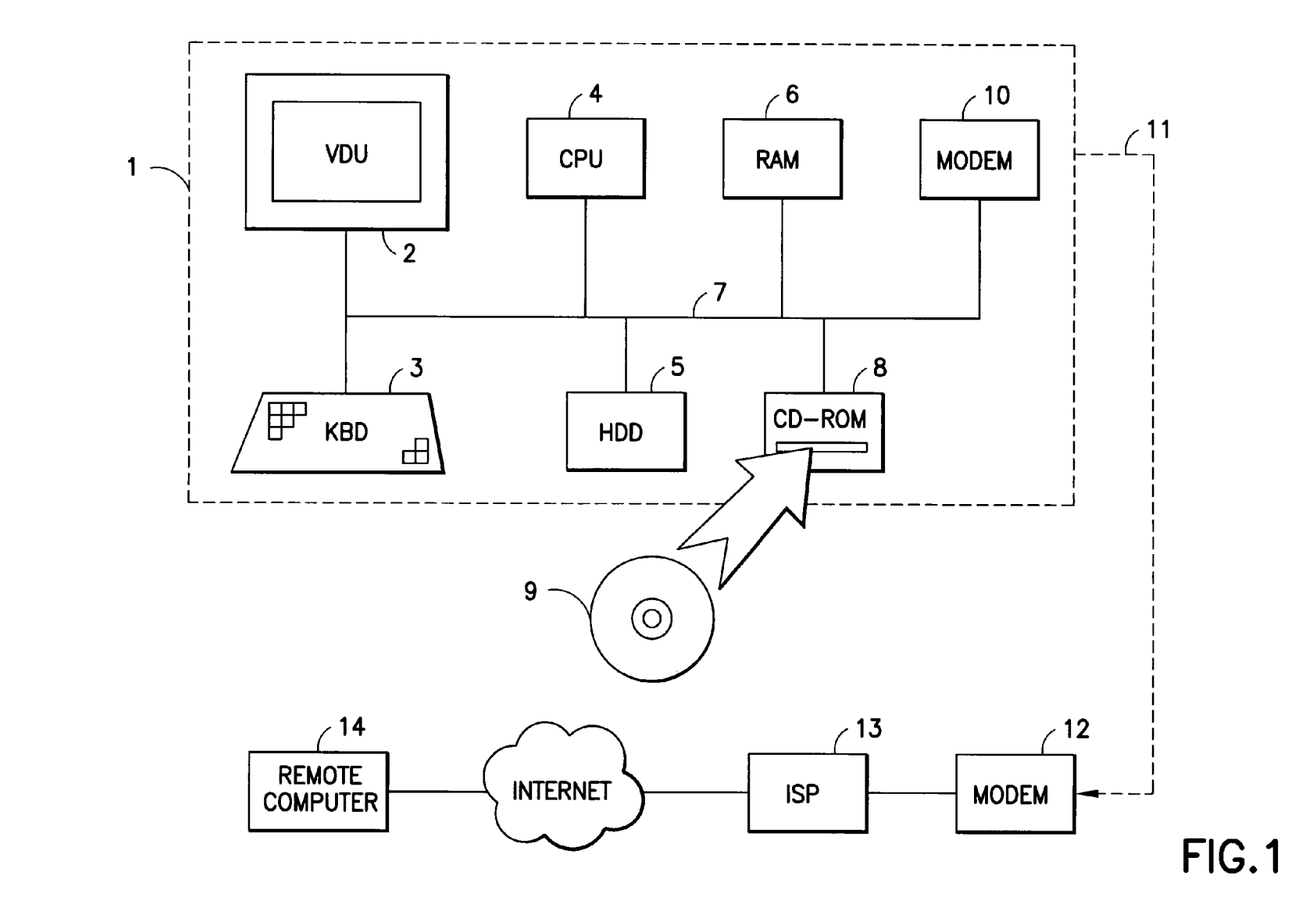
FIG. 1 is a block diagram of an exemplary computer environment.

FIG. 1 shows one embodiment of a computing environment in which the method of the present invention may be carried out and implementations of the system and program product of the invention.

This embodiment comprises a so-called stand alone computer 1, i.e. one which is not permanently linked to a network, including a display monitor 2, a keyboard 3, a microprocessor—based central processing unit 4, a hard-disc drive 5 and a random access memory 6 all coupled one to another by a connection bus 7. The keyboard 3 is operable for enabling the user to enter commands into the computer along with user data. As well as keyboard 3, the computer may comprise a mouse or tracker ball (not shown) for entering user commands especially if the computer is controlled by an operating system with a graphical user interface.

To introduce program instructions into the computer 1, i.e. to load them into the memory 6 and/or store them onto the disc drive 5 so that the computer begins to operate, and/or is made able to operate when commanded, in accordance with the present invention the computer 1 comprises a CD-ROM drive 8 for receiving a CD-ROM 9.

The program instructions are stored on the CD-ROM 9 from which they are read by the drive 8. However, as will be well understood by those skilled in the art, the instructions as read by the drive 8 may not be usable directly from the CD-ROM 9 but rather may be loaded into the memory 6 and stored in the hard disc drive 5 and used by the computer 1 from there. Also, the instructions may need to be decompressed from the CD-ROM using appropriate decompression software on the CD-ROM or in the memory 6 and may, in any case, be received and stored by the computer 1 in a sequence different to that in which they are stored on the CD-ROM.

In addition to the CD-ROM drive 8, or instead of it, any other suitable input means could be provided, for example a floppy-disc drive or a tape drive or a wireless communication device, such as an infra-red receiver (none of these devices being shown).

Finally, the computer 1 also comprises a telephone modem 10 through which the computer is able temporarily to link up to the Internet via telephone line 11, a modem 12 located at the premises of an Internet service provider (ISP), and the ISP's computer 13.

Thus, a program product according to this invention may comprise a storage medium such as the CD-ROM 9 this having stored a body of computer code for causing the computer 1 to carry out the inventive method. Alternatively, the program product may be implemented as a body of computer code made available for downloading to computer 1 from a computer 14 by a supplier operating or using that computer.

The computer 1 does not have to be in a stand along environment. Instead, it could form part of a network (not shown) along with other computers to which it is connected on a permanent basis. It could also be permanently coupled to or have a temporary link to a so-called intranet, i.e. a group of data holding sites similar to Internet sites or URL's and arranged in the same way as the Internet but accessible only to particular users, for example the employees of a particular company. Instead of modem 10, the computer 1 could have a digital hard-wired link to the ISP's computer 13 or the computer 1 could itself comprise a permanently connected Internet site (URL) whether or not acting as an ISP for other remote users. In other words, instead of the invention being usable only through the local keyboard 3, it may be available to remote users working through temporary or permanent links to computer 1 acting as ISP or simply as an Internet site.

The computer software to be optimised could be source code which has been entered into the computer via the keyboard 3, perhaps over a long period, and stored on the hard disc drive 5 or on another CD-ROM entered in the drive 8, assuming the drive and the other CD-ROM are capable of re-writing data to the CD-ROM, or on the aforementioned optional floppy disc—disc or tape drive, or on a file server (not shown) forming part of the aforementioned network, or from storage sites within the Internet or the aforementioned intranet.

The optimisation method will now be described first generally and then as a specific algorithm but, in either case, in the form of comments plus some pseudo-code and/or C/C++ language statements. It will be appreciated however that the use of C/C++ language statements is not intended to limit the scope of the invention to that language since the algorithm is readily transferable to other computer languages.

Consider a procedure

```
int getsomevalue(POINTER*p)
{
    int ch;
    if(p= =NULL)
```

```
        ch = 0;
    else
    {
        ELSE_BODY;
    }
    return ch;
}
``` consider the following code fragment at the call-site;

```
if(p==NULL)
{
    A;
}
else
{
    B;
}
val = getsomevalue(
...
... some use of the variable val ...
```

The method creates two versions of the code:

```
int getsomevalue_0()//to be called when p == 0
{
    return 0;
}
int getsomevalue_1(POINTER(*p)//to be called when p !=NULL
{
    ELSEBODY;
    Return ch;
}
```

At the call-site, we can replace the call to the procedure as

```
if(p==NULL)
{
    A;
}
else
{
    B;
}
if(p==NULL)
    val = getsomevalue_0();
else
    val = getsomevalue_1();
...
... some use of the variable val ...
```

Applying the technique of replicating code for eliminating redundant branching, we get:

```
if(p==NULL)
{
    A;
    val = 0;//inlining ...
    ... some use of the variable val, where we can propagate the
    value 0 ...
}
else
{
    B;
    val = getsomevalue_1();
    ... some use of the variable val ...
}
```

Note that in this example we substituted

```
getsomevalue(p)
with
if(p==NULL)
    val = getsomevalue_0();
else
    val = getsomevalue_1();
```

In this specific example, this substitution resulted in further optimisation of the branches; in a case where no benefit is gained by such substitution, we may retain the original version.

Figure 2A:
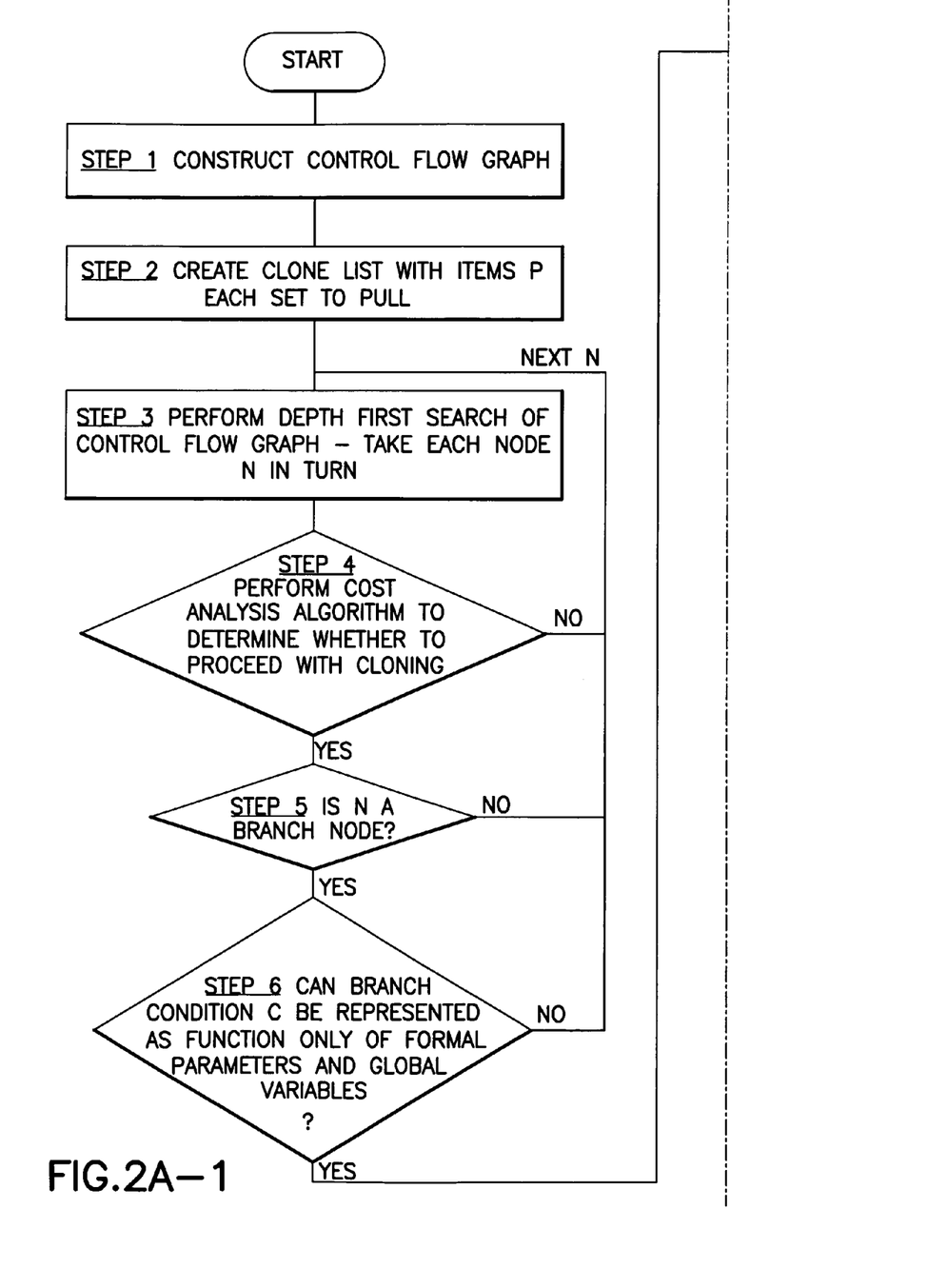
FIGS. 2A and 2B are consecutive sections of a flow chart for explaining a method in accordance with this invention.
Figures 2A, 2A:
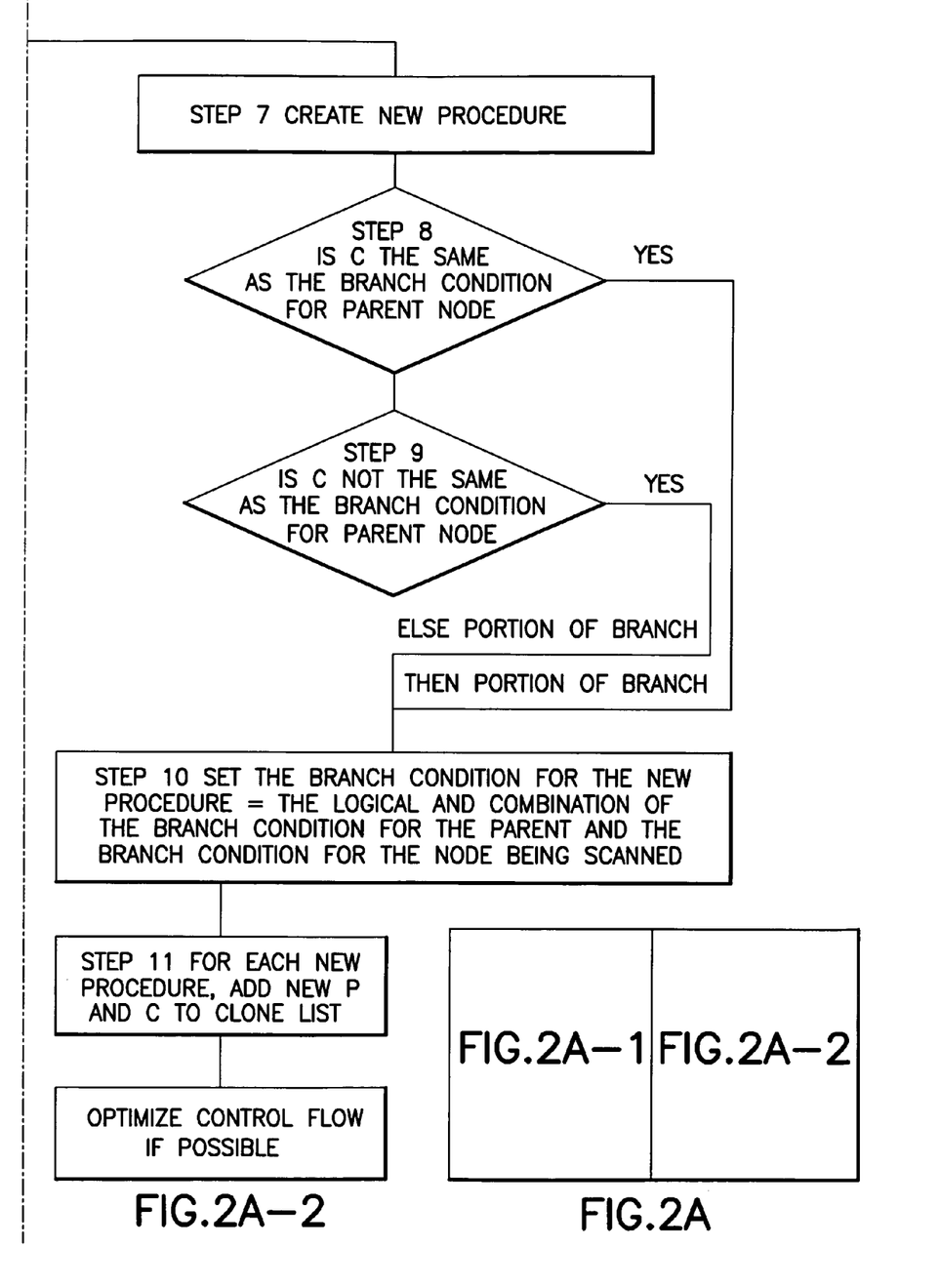
Figure 2B:
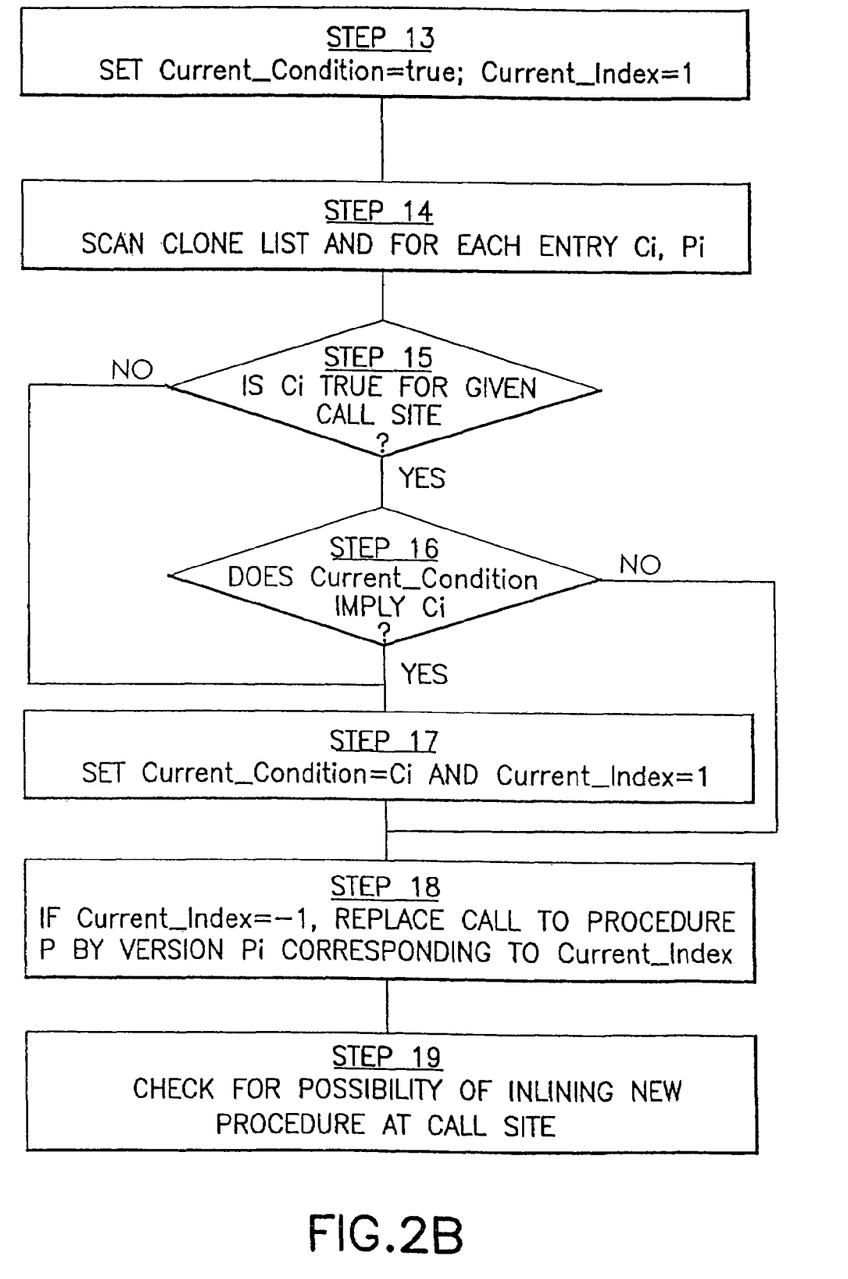

The basic steps of the algorithm required for implementing this technique will now be described with references to the flow chart of FIGS. 2A and 2B. The numbered steps refer to the items in the flow chart. FIGS. 2A and 2B relate respectively to the creation of the procedure clones and activities at the call sites.

Creation of Procedure Clones (FIG. 2A)

| | |
|---|---|
| Step 1 | Construct the control flow graph CFG of the procedure. In addition to the usual fields that the CFG nodes have, we will also maintain a field BRANCH_COND. The reference herein to "construct" in relation to a control flow graph does not necessarily mean forming or displaying an actual visual representation of such a graph. As well known, the graph may be "constructed" in terms of data stored in a computer, for example a series of objects representing respective nodes and edges, or as linked lists, arrays and matrices. |
| Step 2 | Set PROCEDURE_CLONE_LIST(P) = NULL; |
| Step 3 | Perform a Depth First traversal of the CFG. A DFS, "depth first search", is well known in computer science in relation to graph analysis. |
| Step 4 | While traversing a node N, Perform the cost-analysis to determine whether to proceed producing clones. |
| Step 5 | If N is a branch-node and C is the corresponding branch condition. |
| Step 6 | If C can be represented as a function only of the formal parameters and the Global variables (value of global vars at the beginning of the procedure call)(this can be determined by data-flow analysis, also performing value-propagations where necessary) - the emphasis is "initial value" |
| Step 7 | Emit a new subroutine containing all the nodes in the path from the procedure entry to N, and retaining the remaining portion of the CFG as it is. This procedure would be similar in spirit to creating procedure clones, wherein obvious formal parameters and global values may be suppressed. |
| Step 8 | If BRANCH_COND(PARENT(N))=> BRANCH_COND(N)) Take only the "then" portion of the branch |
| Step 9 | If (BRANCH_COND(PARENT(N))=>~ BRANCH_COND(N)) Take only the "else" portion of the branch |
| Step 10 | BRANCH_COND(N) = BRANCH_COND(PARENT(N).AND. BRANCH_COND(N). |
| Step 11 | Create a new <condition, pointer to specialised procedure body> pair and add it to the PROCEDURE_CLONE_LIST |
| Step 12 | During this process, obvious optimisations regarding control flow are applied, e.g. if a branch B1 implies a descendent branch B2, then if B2 is in the TRUE arm of B1, we need to traverse only the TRUE arm of B2. |

At the Call-Sites (FIG. 2B)

| | |
|---|---|
| Step 13 | For a given call statement S to a procedure P, Set CURRENT_CONDITION = TRUE; CURRENT_INDEX = 1; |
| Step 14 | Scan the PROCEDURE-CLONE_LIST(P) and for each entry <Ci, Pi>, where Ci is a condition and Pi denotes a pointer to a specialised procedure body of P, |
| Step 15 | Prove whether Ci holds true in the context of the given call-site |
| Step 16 | If so, verify whether CURRENT_CONDITION implies Ci; |
| Step 17 | If not, set CURRENT_CONDITION = Ci and CURRENT_INDEX = I; (basically, find out the strongest condition that holds at this site, e.g. if both (n<2) and (n<10) hold at a given call-site, we want to substitute the call to the procedure body corresponding to the condition n<2. |
| Step 18 | If(CURRENT_INDEX = −1) replace the call to the procedure P by the version Pi that corresponds to the CURRENT_INDEX using the standard techniques for replacing call-statements with calls to clones. |
| Step 19 | Check whether the new procedure can be inlined at the call-site. |

A similar algorithm is carried out for the case when a condition is known to be false.

Figure 3:
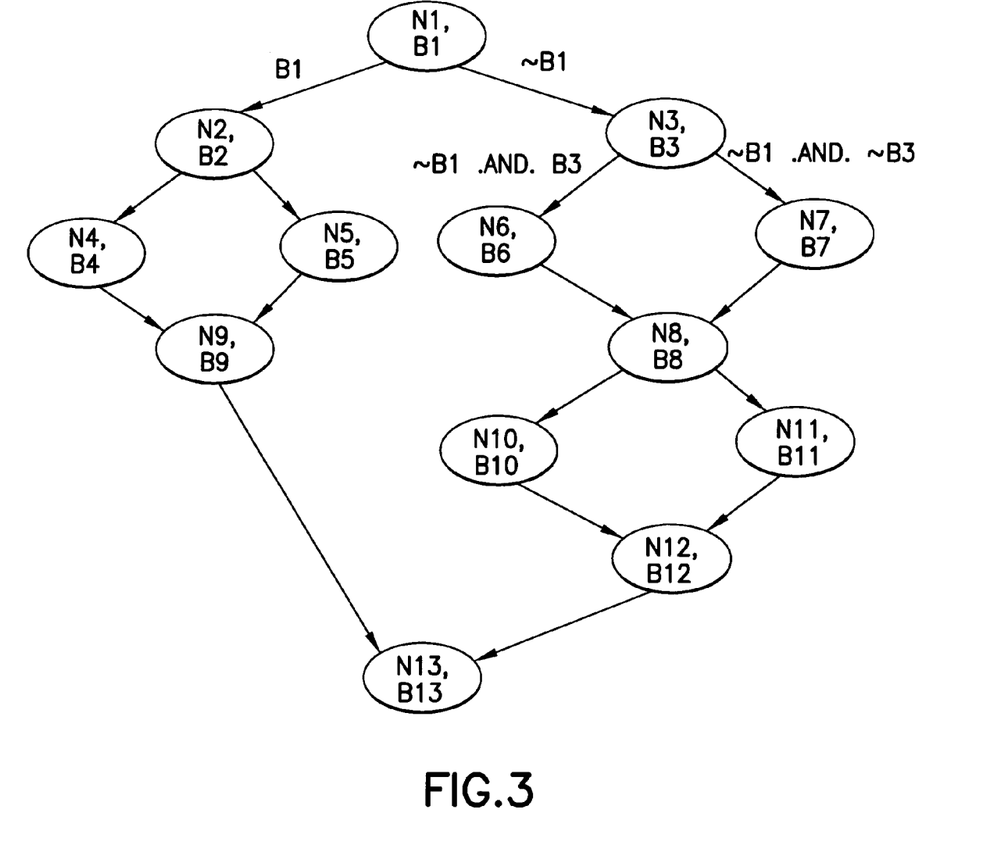
FIGS. 3 to 7 are respective program control flow diagrams relating to the FIG. 2 method.
Figure 4:
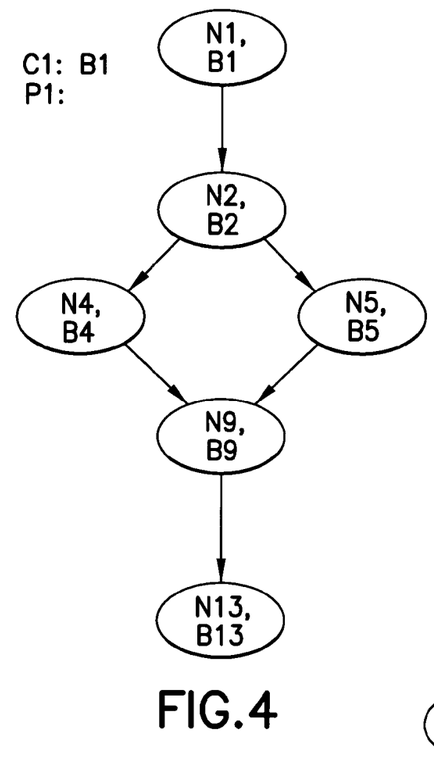
Figure 5:
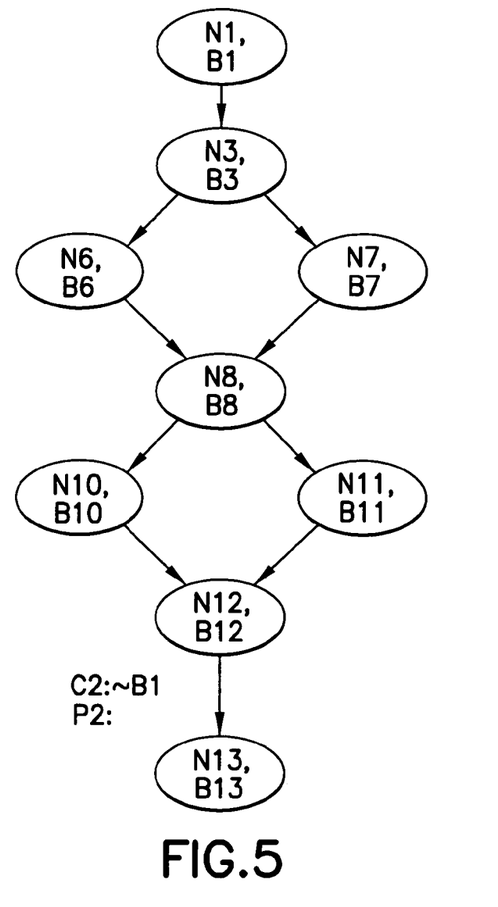
Figures 6, 7:
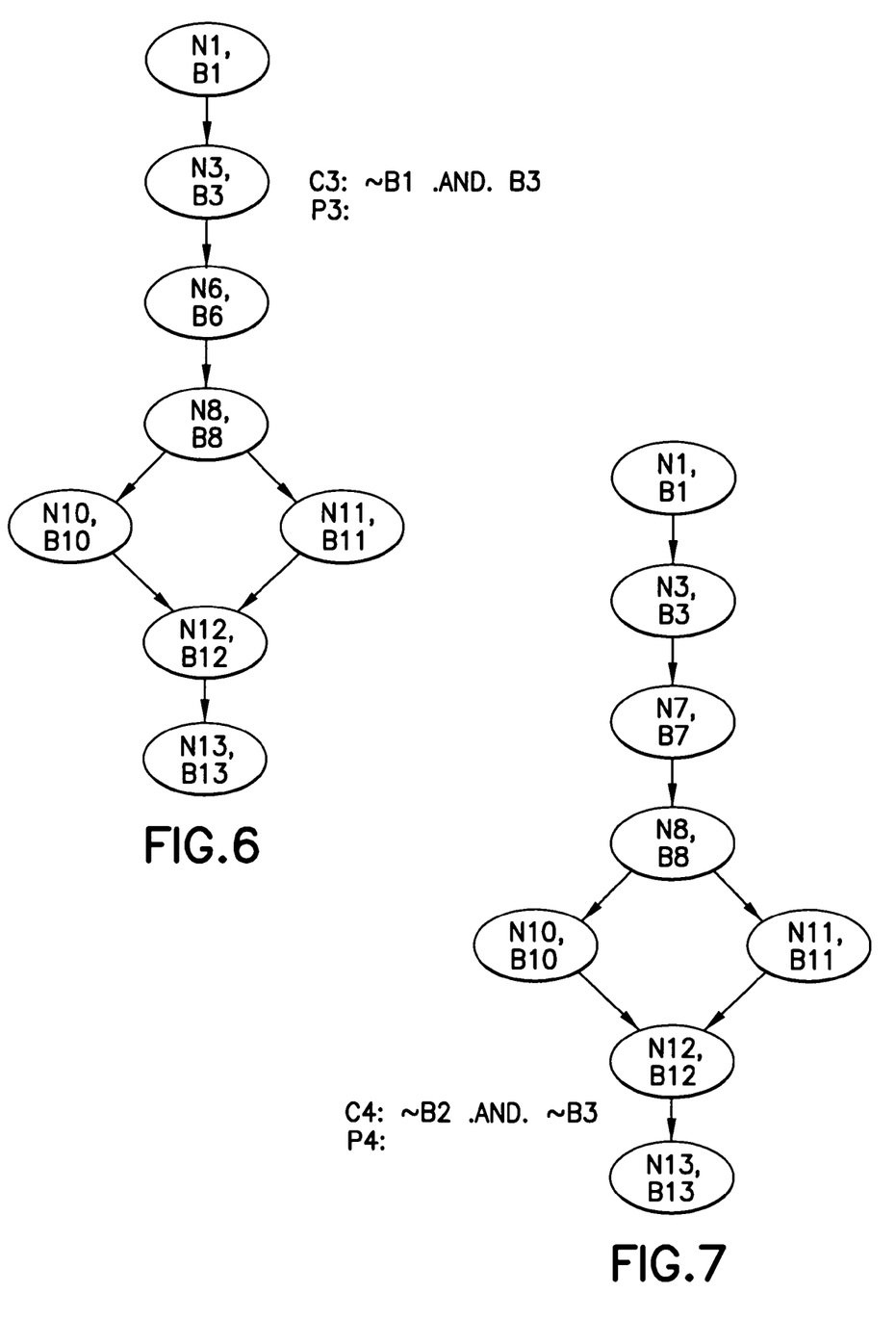

The algorithm will now be described in terms of an example for which FIG. 3 illustrates a control-flow graph. The basic blocks are labelled as Ni,Bi, where Ni represents the node, and Bi represents the branch condition at that node. The left branches are taken when a Bi evaluates to TRUE.

In this example, it is assumed that Node N2 contains code of the type scanf("%d"\n") for a local variable n; and the branch condition B2 is "if(n>0)". Hence, no more splitting of the graph can occur in this branch beyond node N2.

It is also assumed that the cost-analysis heuristic prohibits the splitting of nodes beyond node N8 in that branch.

As shown in FIGS. 4 to 7, the resultant specialised procedures will be:

1. <C1, P1>
2. <C2, P2>
3. <C3, P3>
4. >C4, P4> where the Ci's and Pi's are as defined in the respective Figures.

The method described above helps to optimise the way programmers write procedures. It is a common practice for programmers to first check minor conditions on the parameters and then write the bigger procedure body. The method would eliminate calls to these procedures at call-sites, if the required conditions can be proved at the call-site itself. Elimination of a call-site can lead to major optimisations because all the pessimistic assumptions about the aliases in the program created by a procedure call are eliminated as well. Also, elimination of a call-site is beneficial at run-time, since if the procedure had to return without performing any task, the procedure need not be called at all.

For example, for a procedure
void do_something(int m, int n)
{
if(m<n)return;
if(m==n) SLIGHTLY_BIGGER_PROCEDURE_BODY
else VERY_BIG_PROCEDURE_BODY
} by applying this technique, if (m<n) can be proved at the call-site during compilation, the call to this function would be eliminated.

If (m==n) can be proved at call-site, we will have a procedure with a small procedure body that can even be inlined.

Also such a step might further benefit the analysis of later parts of the program. An analysis of benchmark routines have shown that a large number of optimisations can be made after applying this step.

Whilst particular preferred embodiments of the invention have been shown and described herein by way of example, it will be understood by persons skilled in the art that modifications, developments and other changes in form and detail may be made without departing from the spirit and scope of the invention as defined in the appended claims and equivalents thereof.

The invention claimed is:

1. A method for optimising computer software that includes one or more call statements and a procedure which is callable by the or each call statement, the method being implemented by execution of program instructions by a computer, the program instruction being stored in computer-readable memory, the method comprising the steps of:
   (a) analysing the callable procedure, the callable procedure comprising a branch condition under which control flow code directs program flow from the branch condition to a code branch of two or more code branches, each said code branch being within the callable procedure and branching from the branch condition to program code within the callable procedure, said analysing the procedure identifying the control flow code and the code branches;
   (b) identifying for each said code branch a new procedure containing the respective code branch and not containing the other code branches of the two or more code branches, wherein the new procedures collectively comprise the two or more code branches;
   (c) recording a list of data entries corresponding to the respective new procedures, each entry comprising a data item identifying the respective new procedure and a data item representative of the branch conditions under which said control flow code directs program flow to the associated code branch;
   (d) for the or each call statement, scanning the entries in said list to determine one for which there is correspondence between said branch conditions and call parameters directed to said control flow code by the call statement and modifying the call statement to replace the call to the original procedure by a call to the corresponding new procedure.

2. The method of claim 1, wherein step (a) comprises constructing a control flow graph for the procedure, the control flow graph comprising a branching node representative of said control flow code and further nodes representing respective ones of said code branches.

3. The method of claim 1, wherein one or more of said code branches each itself comprises two or more code branches and an item of control flow code for directing program flow to those code branches and wherein between said steps (a) and (b), said method comprising the further steps of:
   (e) for each item of control flow code, before identifying any new procedure in accordance with step (b) of the method, checking for compliance between one or more predetermined rules for the software and the software should step (b) and following steps of the method take place; and (f) for that item of control flow code, continuing with step (b) and the following steps of the method only in the event of such compliance.

4. The method of claim 3, wherein step (e) comprises the application of a cost-analysis algorithm based on predetermined rules about the length of the software.

5. The method of claim 1, said method including optimising the or each new procedure for which a call parameter is a constant by propagating that constant through the new procedure.

6. The method of claim 1, said method including analysing a call statement, calling parameters and an associated new procedure to determine if they are compliant with predetermined in-lining rules and, if they are so compliant, replacing said call statement by a copy of the new procedure.

7. A method for optimising computer software that includes one or more call statements and a procedure which is callable by the or each call statement, the method being implemented by execution of program instructions by a computer, the program instructions being stored in a computer-readable memory, the method comprising the steps of:

(a) constructing a control flow graph for the callable procedure, the control flow graph comprising one or more branching nodes each representative of respective control flow code and, for each branching node, two or more further nodes each connected to said each branching node by respective code branches to which program flow is directed from the branching node, wherein said one or more branching nodes and said respective code branches are contained within the callable procedure;

(b) considering each node in turn and, if the node being considered is a branching node and if the branching condition for that node by which the respective control flow code directs program flow to the respective code branches is able to be represented as a function only of formal parameters and global variables, identifying a new procedure for which the flow control graph comprises all the nodes in the path from the first node of the procedure to the node being considered, the node being considered, and the whole of the portion of the control flow graph led to directly or indirectly from the node being considered;

(c) recording a list of data entries corresponding to the respective new procedures, each entry comprising a data item identifying the respective new procedure and a data item representative of the corresponding branching condition;

(d) for each said call statement, scanning the entries in said list to determine one for which there is correspondence between said branch condition and call parameters supplied by the call statement; and (e) modifying the call statements to call said new procedures.

8. A computer system comprising program instructions adapted to be executed for optimising computer software that includes one or more call statements and a procedure which is callable by the or each call statement the program instructions being stored in a computer-readable memory, the program instructions comprising:

(i) analysing means for analysing the callable procedure, the callable procedure comprising a branch condition under which control flow code directs program flow from the branch condition to a code branch of two or more code branches, each said code branch being within the callable procedure and branching from the branch condition to program code within the callable procedure, said means for analysing the procedure comprising means for identifying the control flow code and the code branches;

(ii) identifying means for identifying for each said code branch a new procedure containing the respective code branch and not containing the other code branches of the two or more code branches, wherein the new procedures collectively comprise the two or more code branches;

(iii) recording means for recording a list of data entries corresponding to the respective new procedures, each entry comprising a data item identifying the respective new procedure and a data item representative of the branch conditions under which said control flow code directs program flow to the associated code branch;

(iv) scanning means operable, for each said call statement, for scanning the entries in said list to determine one for which there is correspondence between said branch conditions and call parameters supplied by the call statement; and (v) modifying means for modifying the call statement to call the corresponding new procedure.

9. The computer system of claim 8, wherein said analysing means is operable for storing data representing the nodes and edges of a control flow graph for the procedure, said nodes including a branching node representative of said control flow code and further nodes representative of respective ones of said code branches.

10. The computer system of claim 8, wherein one or more of said code branches each itself comprises two or more code branches and an item of control flow code for directing program flow to those code branches and wherein the system comprises checking means which is operable to check for compliance between one or more predetermined rules for the software and the software should said identifying means identify any new procedure.

11. The computer system of claim 10, wherein said checking means is operable for checking compliance with a cost-analysis algorithm based on predetermined rules about the length of the software.

12. The computer system of claim 8, said program instructions including means for optimising the or each new procedure for which a call parameter is a constant by propagating that constant through the new procedure.

13. The computer system of claim 8, said program instructions including means for analysing a call statement, calling parameters and an associated new procedure to determine if they are compliant with predetermined related to in-lining and, if they are so compliant, replacing said call statement by a copy of the new procedure.

14. A computer system comprising program instructions adapted to be executed for optimising computer software that includes one or more call statements and a procedure which is callable by the or each call statement, the program instructions being stored in a computer-readable memory, the program instructions comprising:

(i) means for storing data representing a control flow graph for the callable procedure, the control flow graph comprising one or more branching nodes each representative of respective control flow code and, for each branching node, two or more further nodes each connected to said each branching node by respective code branches to which program flow is directed from the branching node, wherein said branching nodes, said further nodes, and said code branches are contained within the callable procedure;

(ii) means for traversing the control flow graph to consider each node in turn and, if the node being considered is a branching node and if the branching condition for that node by which the respective control flow code directs program flow to the respective code branches is able to be represented as a function only of formal parameters and global variables, identifying a new procedure for which the flow control graph comprises all the nodes in the path from the first node of the procedure to the node being considered, the node being considered, and the whole of the portion of the control flow graph led to directly or indirectly from the node being considered;

(iii) means for recording a list of data entries corresponding to the respective new procedures, each entry comprising a data item identifying the respective new procedure and a data item representative of the corresponding branching condition;

(iv) means for scanning the entries in said list to determine for each call statement, an entry for which there is correspondence between said branch condition and call parameters supplied by the call statement; and (v) means for modifying the call statements to call said new procedures.

15. A computer program product comprising computer code stored in a computer-readable memory, the computer code when executed by a computer implements a method for optimising computer software that includes one or more call statements and a procedure which is callable by the or each call statement said computer code comprising:

(i) a first computer code portion for analysing the callable procedure, the callable procedure comprising a branch condition under which control flow code directs program flow from the branch condition to a code branch of two or more code branches, each said code branch being within the callable procedure and branching from the branch condition to program code within the callable procedure, said analysing the procedure identifying the control flow code and the code branches;

(ii) a second computer code portion for identifying for each said code branch a new procedure containing the respective code branch and not containing the other code branches of the two or more code branches, wherein the new procedures collectively comprise the two or more code branches;

(iii) a third computer code portion for recording a list of data entries corresponding to the respective new procedures, each entry comprising a data item identifying the respective new procedure and a data item representative of the branch conditions under which said control flow code directs program flow to the associated code branch;

(iv) a fourth computer code portion operable, for each said call statement, for scanning the entries in said list to determine one for which there is correspondence between said branch conditions and call parameters supplied by the call statement; and (v) a fifth computer code portion for modifying the call statement to call the corresponding new procedure.

16. A computer program product for optimising computer software that includes one or more call statements and a procedure which is callable by the or each call statement and which has two or more code branches and control flow code for directing program flow to the code branches, said program product comprising computer code which includes:

(i) a first computer code portion for analysing the procedure to identify said control flow code and said code branches;

(ii) a second computer code portion for identifying for each said code branch a new procedure containing the respective code branch;

(iii) a third computer code portion for recording a list of data entries corresponding to the respective new procedures, each entry comprising a data item identifying the respective new procedure and a data item representative of the branch conditions under which said control flow code directs program flow to the associated code branch;

(iv) a fourth computer code portion operable, for each said call statement, for scanning the entries in said list to determine one for which there is correspondence between said branch conditions and call parameters supplied by the call statement; and (v) a fifth computer code portion for modifying the call statement to call the corresponding new procedure, said computer software implemented in the form of a body of computer code made available for downloading from a computer connected to a computer network.

17. A computer program product comprising computer code stored in a computer-readable memory, the computer code when executed by a computer implements a method for optimising computer software that includes one or more call statements and a procedure which is callable by the or each call statement, said computer code comprising:

(i) a first code portion for storing data representing a control flow graph for the callable procedure, the control flow graph comprising one or more branching nodes each representative of respective control flow code and, for each branching node, two or more further nodes respective code branches to which program flow is directed from the branching node, wherein said branching nodes, said further nodes, and said code branches are contained within the callable procedure;

(ii) a second code portion for traversing the control flow graph to consider each node in turn and, if the node being considered is a branching node and if the branching condition for that node by which the respective control flow code directs program flow to the respective code branches is able to be represented as a function only of formal parameters and global variables, identifying a new procedure for which the flow control graph comprises all the nodes in the path from the first node of the procedure to the node being considered, the node being considered, and the whole of the portion of the control flow graph led to directly or indirectly from the node being considered;

(iii) a third code portion for recording a list of data entries corresponding to the respective new procedures, each entry comprising a data item identifying the respective new procedure and a data item representative of the corresponding branching condition;

(iv) a fourth code portion operable, for each said call statement, for scanning the entries in said list to determine one for which there is correspondence between said branch condition and call parameters supplied by the call statement; and (v) a fifth code portion for modifying the call statements to call said new procedures.

18. A computer program product for optimising computer software that includes one or more call statements and a procedure which is callable by the or each call statement, said program product comprising computer code which includes:

(i) a first code portion for storing data representing a control flow graph for the procedure, the control flow graph comprising one or more branching nodes each representative of respective control flow code and, for each branching node, two or more further nodes representing respective code branches to which program flow is directed by the branching node;

(ii) a second code portion for traversing the control flow graph to consider each node in turn and, if the node being considered is a branching node and if the branching condition for that node by which the respective control flow code directs program flow to the respective code branches is able to be represented as a function only of formal parameters and global variables, identifying a new procedure for which the flow control graph comprises all the nodes in the path from the first node of the procedure to the node being considered, the node being considered, and the whole of the portion of the control flow graph led to directly or indirectly from the node being considered;

(iii) a third code portion for recording a list of data entries corresponding to the respective new procedures, each entry comprising a data item identifying the respective new procedure and a data item representative of the corresponding branching condition;

(iv) a fourth code portion operable, for each said call statement, for scanning the entries in said list to determine one for which there is correspondence between said branch condition and call parameters supplied by the call statement; and (v) a fifth code portion for modifying the call statements to call said new procedures, said computer software implemented in the form of a body of computer code made available for downloading from a computer connected to a computer network.

* * * * *